United States Patent [19]

Lange

[11] Patent Number: 5,184,373
[45] Date of Patent: Feb. 9, 1993

[54] CASTER WITH CONDUCTORS BETWEEN THE TIRE OF ITS WHEEL AND THE CARRIER OF ITS WHEEL FRAME

[75] Inventor: Hans-Willi Lange, Wermelskirchen, Fed. Rep. of Germany

[73] Assignee: Albert Schulte Söhne GmbH & Co., Wermelskirchen, Fed. Rep. of Germany

[21] Appl. No.: 812,620

[22] Filed: Dec. 23, 1991

[30] Foreign Application Priority Data

Dec. 22, 1990 [DE] Fed. Rep. of Germany ....... 4041512

[51] Int. Cl.$^5$ .......................... B62C 7/02; B60B 33/00
[52] U.S. Cl. .................................. 16/35 R; 188/1.12
[58] Field of Search ............... 16/35 R, 35 D, 45, 47, 16/38; 188/1.12, 74, 76, 69

[56] References Cited

U.S. PATENT DOCUMENTS 4,998,320 3/1991 Lange ............................ 16/35 R

*Primary Examiner*—W. Donald Bray
*Attorney, Agent, or Firm*—Peter K. Kontler

[57] ABSTRACT

A caster wherein the metallic carrier for a plastic wheel frame is connected to the conductive tire of the wheel by a multi-section conductor system having a portion in the disc-shaped connector between the rim and the hub of the wheel, a portion which is connected with the outer race of an antifriction ball bearing surrounding the hub, a shaft forming part of a fulcrum for the hub of the wheel, a wire in an internal groove of one leg of the wheel frame, the devices which can be actuated to brake the wheel and to block angular movements of the frame relative to the carrier, and a spring which connects the two devices to one another. The braking and blocking devices can be actuated by a conductive plunger which is non-rotatably but axially movably installed in and contacts the carrier and can be shifted by a spring in cooperation with a rotary cam in the carrier. The conductor system serves to convey static electric charges between the conductive tire of the rim and the carrier which latter is installed in the leg of a piece of furniture or in any other object or body to be mounted on one or more casters.

20 Claims, 2 Drawing Sheets

CASTER WITH CONDUCTORS BETWEEN THE TIRE OF ITS WHEEL AND THE CARRIER OF ITS WHEEL FRAME

BACKGROUND OF THE INVENTION

The invention relates to casters in general, and more particularly to improvements in casters of the type wherein the wheel frame is rotatable relative to its carrier about a first axis and the wheel is rotatable in the frame about a second axis which is inclined relative to the first axis. Still more particularly, the invention relates to improvements in casters wherein the frame can be blocked against rotation about the first axis and the wheel can be braked against rotation about the second axis.

It is already known to make the wheel and the frame of a caster from a suitable plastic material and to design the actuating mechanism for the braking and blocking devices in such a way that the mechanism employs a reciprocable plunger or pin which can be moved between a plurality of positions to thereby actuate or release the one and/or the other of these devices. An advantage of a caster wherein the frame and the wheel are made of a plastic material is that the selected plastic material can impart to such parts, and to the entire caster, an eye-pleasing appearance. By way of example, such casters can be used with advantage to support the legs of beds in hospitals, sanitaria, convalescent homes and similar establishments as well as in private residences. As a rule, a mobile bed is located in a building so that the wheels of its casters are caused to roll along a floor which is often provided with a covering of plastic material. This results in the development of a static charge when the plastic wheels are caused to roll along the plastic coating of the floor. The development of such charges is highly undesirable in many instances, for example, when the bed supports or is connected with one or more electrical diagnostic, treating and/or other implements, instruments and/or apparatus. The charges can affect the accuracy of such components and/or otherwise prevent them from operating in the prescribed manner. Prevention of propagation of such charges between the wheel and the carrier of the wheel frame is particularly difficult when the caster is provided with the aforediscussed braking and blocking devices which are necessary to prevent any movements of the wheel and/or to prevent any changes in the direction of movement of the wheel.

OBJECTS OF THE INVENTION

An object of the invention is to provide a novel and improved caster which is constructed and assembled in such a way that a path for the flow of electric current between selected parts of the caster is established at all times.

Another object of the invention is to provide a novel and improved wheel for use in the above outlined caster.

A further object of the invention is to provide a novel and improved rim for use in the above outlined wheel.

An additional object of the invention is to provide a novel and improved electrical connection between that portion of a caster wheel which comes into contact with the floor and the carrier for the frame of the caster wheel.

Still another object of the invention is to provide a novel and improved frame for the wheel of a caster.

An additional object of the invention is to provide a novel and improved connection between the wheel and the frame of the above outlined caster.

A further object of the invention is to provide novel and improved electrical connections between various discrete component parts of a caster, particularly a caster wherein the wheel frame is rotatable relative to its carrier and the wheel is rotatable relative to the frame.

Another object of the invention is to provide a novel and improved method of electrically connecting the floor contacting part or parts of a caster with the carrier which mounts the wheel frame in the leg of a bed or in or on any other part which carries or is connected with one or more electrical instruments, implements or apparatus.

Still another object of the invention is to provide a novel and improved electrical connection between the wheel braking device and the frame blocking device of the above outlined caster.

An additional object of the invention is to enhance the safety of bedridden persons in hospitals and other establishments wherein the bed is mounted on casters and further serves to support or is connected with one or more electrical diagnostic and/or treating instruments or apparatus.

A further object of the invention is to provide a caster whose appearance is not affected by the provision of the aforediscussed electrical connections between its constituents.

SUMMARY OF THE INVENTION

The invention is embodied in a caster which comprises a conductive carrier adapted to be installed in or on a piece of furniture or the like, an insulating frame which is mounted on the carrier for rotation about a first axis (such axis is normally a vertical or substantially vertical axis), a wheel which is mounted in the frame for rotation about a second axis which is inclined with reference to the first axis (the second axis is normally a horizontal or nearly horizontal axis), a conductive rim which forms part of the wheel, a braking device which is actuatable to oppose rotation of the wheel about the second axis, a blocking device which is actuatable to prevent rotation of the frame about the first axis, means for actuating the braking and blocking devices, and means for electrically connecting the carrier with the rim of the wheel. The connecting means can include at least a portion of at least one of the braking and blocking devices.

The frame can be made, at least in part, of a plastic material.

In accordance with a presently preferred embodiment, the actuating means comprises a plunger which is non-rotatably but axially movably mounted in the carrier, and means for moving the plunger between a plurality of positions including a first position in which the plunger actuates the blocking device, a second position in which the plunger actuates the braking device, and a third position in which the two devices are idle. The moving means can comprise means for biasing the plunger to at least one of the aforementioned positions, e.g., to the third position, and a cam which is rotatably mounted in the carrier and is engaged by the plunger under the action of the biasing means.

The connecting means can comprise a plurality of discrete electrically connected sections.

The rim preferably contains a plastic material and the carrier can be made of, or can contain, a metallic material.

The wheel further comprises a hub and a spoke (e.g., a circumferentially complete disc-shaped spoke) which connects the rim with the hub. The spoke can be provided with at least one (first) channel, and the connecting means can comprise a first portion which is connected with the rim and is disposed in the at least one channel, and a further portion which is connected with the first portion and includes an antifriction bearing which is installed in the frame and mounts the hub. The rim can include a conductive tire which contains a plastic material (such as a mixture of rubber or another elastomeric material) and conductive particles of metal or the like, and is connected with the first portion of the connecting means, and the rim then further includes an annular support (e.g., in the form of a short cylinder) which is surrounded by the tire and is rigid (e.g., of one piece) with the spoke. The aforementioned disc which constitutes a presently preferred embodiment of the spoke extends radially of the second axis between the hub and the support of the rim.

The bearing has an outer race and an inner race, and the connecting means preferably further comprises a fulcrum for the hub of the wheel. The fulcrum is mounted in the frame and is contacted by the inner race and defines the second axis. The frame includes two legs which flank the wheel and the bearing, and the fulcrum can include two conductive (e.g., metallic) sleeves each of which is adjacent one of the legs, and a bolt or shaft which extends through and connects the sleeves to each other. The inner race of the bearing surrounds portions of and contacts the sleeves of the fulcrum.

The frame can include two legs which flank the wheel and a web between the legs. At least one of the legs can be provided with at least one groove which is adjacent the wheel and extends from the second axis to the web. The connecting means then comprises the aforementioned fulcrum and a conductor connected to the fulcrum, disposed in the at least one groove and connected with the fulcrum as well as with the carrier, for example, by way of at least one of the braking and blocking devices.

The connecting means can further comprise at least one leaf spring, torsion spring or another resilient element which is installed between the braking device (which is connected with the aforementioned conductor) and the actuating means (which is electrically connected with the carrier).

The hub of the wheel can be provided with at least one (second) channel which preferably extends in parallelism with the second axis and communicates with the (preferably radially extending) first channel in the spoke of the wheel. The connecting means then comprises the aforementioned first portion in the first channel (of the spoke) and a second portion which is disposed in the second channel and connects the first portion with one race (e.g., the outer race) of the antifriction bearing for the wheel. As already mentioned above, the first portion contacts the conductive tire of the rim.

The conductor in the at least one groove of the at least one leg of the frame for the wheel can comprise a resilient terminal which bears against the fulcrum, particularly against one end face of the aforementioned bolt or shaft which serves to connect the two sleeves of the fulcrum to each other.

The novel features which are considered as characteristic of the invention are set forth in particular in the appended claims. The improved caster itself, however, both as to its construction and the mode of assembling and using the same, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
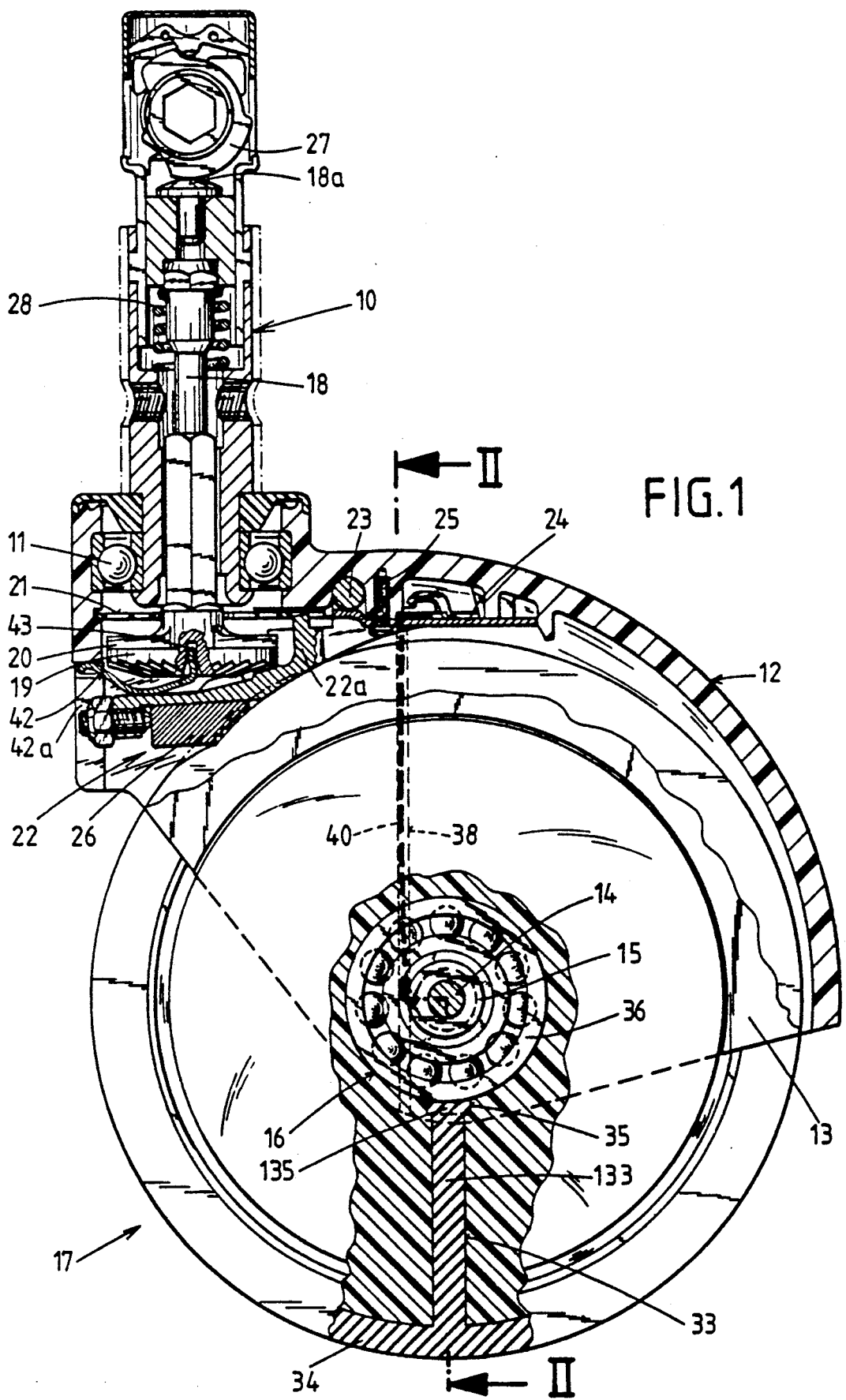
FIG. 1 is a partly side elevational and partly vertical sectional view of a caster which embodies one form of the invention and wherein the blocking and braking devices are actuatable by a plunger which is reciprocable in a metallic carrier by a rotary cam in cooperation with a coil spring.
Figure 2:
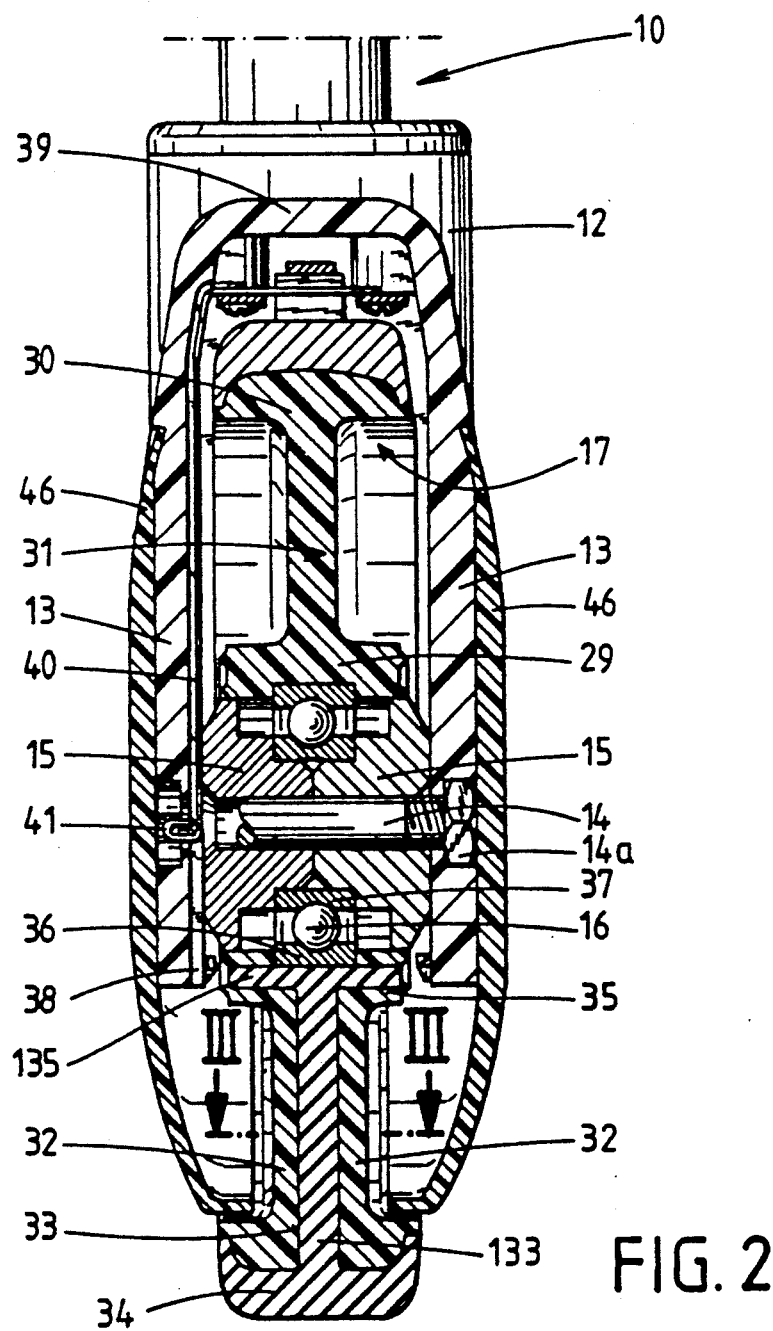
FIG. 2 is a sectional view of the wheel and wheel frame, substantially as seen in the direction of arrows from the line II—II in FIG. 1.

In many respects, the caster of the present invention is similar to that which is disclosed in commonly owned copending patent application Ser. No. 07/768,059 filed Sep. 27, 1991 for "Caster with pivotable two-armed wheel brake". It comprises an elongated tubular carrier 10 which is made of a metallic material and is insertable into a blind bore or hole or into a through bore or hole in the leg of a piece of furniture such as a hospital bed (the leg is indicated in FIG. 1 by phantom lines). The carrier 10 can be releasably held in the leg by one or more radially extending screws or other suitable fasteners, not shown. The lower end portion of the carrier 10 is surrounded by and is rigid with the inner race of an antifriction ball bearing 11, and the outer race of this bearing is fixedly secured to a tubular portion of a web 39 (FIG. 2) forming part of a bifurcated frame 12 of non-conductive plastic material. The frame 12 further includes two downwardly extending legs or sidewalls 13 carrying caps 46 which confine and conceal substantial portions of a wheel 17. The wheel 17 is rotatable about the horizontal axis of a bolt or shaft 14 forming part of a four-piece fulcrum which further comprises two mirror symmetrical sleeves 15 and a nut 14a. The shaft 14 cooperates with the nut 14a to enable the sleeves 15 to engage and hold the inner race 37 of an antifriction ball bearing 16. The outer race 36 of the bearing 16 is preferably fixedly installed in the central portion of a tubular hub 29 forming the radially innermost part of the wheel 17. The wheel 17 further comprises a rim composed of a short cylindrical support 30 and a tire 34 which surrounds the support 30 and conducts electric current. To this end, the tire 34 is made of an elastomeric material (such as rubber or plastic) with a plurality of small metallic particles embedded therein. Still further, the wheel 17 comprises a substantially disc-shaped or washer-like intermediate portion 31 (hereinafter called spoke for short) which is preferably of one piece with the hub 29 as well as with the support 30.

The axis (of the antifriction bearing 11) about which the frame 12 can swivel or rotate relative to the carrier 10 is vertical or nearly vertical and is normal to the axis which is defined by the antifriction bearing 16 for the wheel 17.

The caster further comprises a braking device 22 which can be actuated by a vertically reciprocable plunger 18 to engage or disengage the peripheral surface of the tire 34 and to thus prevent or permit rotation of the wheel 17 about the axis of the shaft or bolt 14. The caster also comprises a blocking device including a disc 20 which is located at the lower end of the plunger 18 and can be actuated by the plunger to confine the wheel 17 to movements in one or more selected directions, i.e., to prevent swivelling or rotation of the frame 12 about the vertical axis which is defined by the ball bearing 11. The plunger 18 has a polygonal section which is non-rotatably received in a complementary part of the the axial passage in the carrier 10, i.e., the plunger is movable axially of but cannot rotate in the carrier. The means for moving the plunger 18 between a plurality of different positions comprises a rotary cam 27 which is rotatably installed in the top portion of the carrier 10 and has three lobes located at three different distances from its horizontal axis, and the moving means further comprises a coil spring 28 which reacts against an internal shoulder of the carrier and bears against an external shoulder of the plunger so that a partly spherical follower 18a of the plunger is permanently biased against the adjacent lobe of the cam 27. The means for rotating the cam 27 about its horizontal axis can include a key, a wheel, a handle or any other suitable implement, not shown. The cam 27 can move the plunger 18 to the illustrated lower end position in which the braking device 22 is actuated to prevent rotation of the wheel 17 and the blocking device is idle. If the angular position of the cam 27 is changed to a first extent, the spring 28 pushes the plunger 18 upwardly to an intermediate position in which the braking and blocking devices are idle, i.e., the wheel 17 is free to turn about the axis of the shaft 14 and the frame 12 is free to swivel about the common axis of the carrier 10, plunger 18 and bearing 11. Still further, the cam 27 can be turned to another angular position in which the spring 28 is free to lift the plunger 18 to an upper end position so that the ribs or otherwise configurated projections at the upper side of the disc 20 are compelled to enter complementary grooves or recesses in a plate 21 which is non-rotatably installed in the frame 12. This enables the parts 20, 21 to block any and all angular movements of the frame 12 except in a selected direction which is determined by orientation of the projection or projections at the upper side of the disc 20. The latter is of one piece with or is otherwise non-rotatably secured to the plunger 18.

The exact construction of the braking and blocking devices forms no part of the present invention; they can be constructed and assembled in a manner as disclosed in the aforementioned copending patent application Ser. No. 07/768,059. FIG. 1 merely shows a face gear 19 at the underside of the blocking disc 20, a bearing pin 23 which is part of a holder 22a of the braking device and is held in a complementary socket at the underside of the web 39, and a retainer 24 which is secured to the web 39 by one or more threaded fasteners 25 to hold the pin 23 in its socket. The holder 22a of this pin supports an adjustable brake shoe 26. The upper side of the holder 22a of the braking device 22 has teeth which are complementary to the teeth of the gear 19 at the underside of the blocking disc 20.

As already mentioned above, the frame 12 is made of a non-conductive plastic material, the same as the major part of the wheel 17. The holder 22a of the adjustable brake shoe 26 and the pin 23 are made of a conductive (e.g., metallic) material, the same as the retainer 24, the plunger 18 and the carrier 10. The retainer 24 can consist of a piece of spring steel or other springy metallic material.

In contrast to the mechanical actuating means including the plunger 18, spring 28 and cam 27, the caster which is disclosed in the copending application Ser. No. 07/768,059 is provided with fluid-operated actuating means for the braking and blocking devices. Such fluid-operated actuating means can be used with equal advantage in the caster of the present invention, the same as an electromagnetic or any other suitable actuating means, as long as it permits the establishment of an electrical connection between the carrier 10 and the tire 34.

Figure 3:
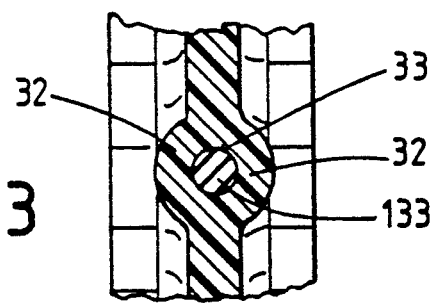
FIG. 3 is a fragmentary sectional view substantially as seen in the direction of arrows from the line III—III of FIG. 2.

In accordance with a feature of the invention, the caster comprises means for electrically connecting the tire 34 with the carrier 10. Such connecting means preferably includes several discrete sections and can include the braking device 22 and/or the blocking device 19-21. A first portion of the connecting means includes at least one substantially radially extending conductor 133 which is provided in a channel 33 defined by a tubular portion 32 (see particularly FIG. 3) of the spoke 31. The channel 33 is filled with a conductive material which constitutes the portion 133 and is integral with the tire 34 as well as with a second portion 135 in an axially parallel channel or recess 35 of the hub 29. The portion 135 of the connecting means is in contact with the outer race 36 of the bearing 16, and this outer race is conductively connected to the inner race 37 by the rolling elements of the bearing 16. The inner race 37 contacts the conductive sleeves 15 of the fulcrum, and these sleeves contact the shaft 14. The left-hand end face of the shaft 14 (as viewed in FIG. 2) is contacted by the substantially hook-shaped resilient terminal 41 of a wire-like conductor 40 which is installed in a radially extending groove 38 at the inner side of the left-hand leg 13 of the frame, and this groove extends all the way to the web 39 of the frame 12 so that the upper end portion of the wire-like conductor 40 can be soldered, screwed or otherwise conductively connected with the retainer 24 and hence (by way of the pin 23) with the holder 22a of the brake shoe 26. The holder 22a is engaged by a conductive leaf spring 42 one end portion of which is received in a vertical slot 42a of the frame 12 and the other end portion of which is received in a centrally located blind bore or socket 43 of the blocking disc 20 (i.e., of the plunger 18). The plunger 18 is conductively connected with the carrier 10.

The tire 34, the portions 133, 135, the bearing 16 and the fulcrum 15, 14, 15 can be said to constitute a first discrete section of the connecting means. The second section of such connecting means includes the wire-like conductor 40 and its terminal 41, the retainer 24 and the holder 22a of the brake shoe 26. The third section of the connecting means includes the spring 42, the blocking disc 20 and the plunger 18.

The spoke 31 of the wheel 17 can be provided with two or more channels 33 for two or more conductive portions 133, and the hub 29 can be provided with two or more axially parallel channels or recesses 35 for an equal number of conductive portions 135. Furthermore, each of the two legs 13 can be provided with a groove or recess 38 for a discrete wire-like conductor 40, and the terminals 41 of such conductors are then caused to bear against the respective end faces of the shaft 14.

The portions 133, 135 and the tire 34 can constitute a prefabricated blank which is inserted into a mold for the making of the parts 30, 31, 32, 29 of the wheel 17. This simplifies the making of the wheel 17 and of the first section 34, 133, 135 of the electrical connection between the tire 34 and the carrier 10. The outer race 36 of or the entire bearing 16 can also find room in the aforementioned mold so that the race 36 is properly embedded in the hub 29 as soon as the plastic material of the hub 29, spoke 31, its tubular portion 32 and support 30 sets.

The leaf spring 42 (or an analogous conductive element) ensures that the conductor 40 is electrically connected with the plunger 18 (and hence with the carrier 10) regardless of the axial position of the plunger, i.e., even at a time when the axial position of the plunger is such that the blocking device 19-21 does not contact the holder 22a of the brake shoe 26. This leaf spring is non-rotatably held in the slot 42a of the frame 12 and bears against the surface surrounding the axial bore or socket 43 of the plunger 18.

The connecting means ensures the flow of electric current from the carrier 10 to the tire 34 or in the opposite direction regardless of the axial position of the plunger 18, i.e., regardless of whether or not the braking device 22 is actuated and/or regardless of whether or not the blocking device 19-21 is actuated. Thus, static electricity which develops or can develop as a result of rolling and/or sliding movement of the tire 34 along a plastic floor covering cannot affect the electrical instrument(s) and/or other electrically operated apparatus which might be mounted on or connected with the bed one leg of which receives the carrier 10.

The brake shoe 26 can be made, and normally consists, of a metallic material for the sake of stability. Thus, when the braking device 22 is actuated, the portions 133, 135, 16, 40, 24, 23 of the connecting means are bypassed because the metallic brake shoe 26 directly engages the conductive tire 34 so that the latter is connected with the carrier 10 by the brake shoe 26, by the adjacent portion of the holder 22a for the brake shoe, by the spring 42 and by the plunger 18.

If the parts 29, 31, 32, 30 of the wheel 17 are made in a first step and such parts are thereupon placed into a mold for the pouring of conductive material which is to form the tire 34, the portion 133 and the portion 135, the channel 35 can serve as a port for evacuation of air which is expelled from the channel 33.

If the wire-like conductor 40 and its terminal are not made of a resilient material, the caster can be provided with a spring which biases the terminal 41 against the adjacent end face of the shaft 14. The illustrated terminal 41 can further serve as a means for reliably anchoring the radially inner end of the conductor 40 in the respective leg 13 of the frame 12.

The improved caster is susceptible of many additional modifications without departing from the spirit of the invention. For example, the groove 38 and the wire 40 can be omitted if the inner side of the one and/or the other leg 13 of the insulating frame 12 is coated with a film of conductive material. Furthermore, such insulating material can also coat the inner side of the web 39 to establish a one-piece electrical connection between the shaft 14 and/or the one and/or the other sleeve 15 on the one hand, and the plunger 18 on the other hand. This would render it possible to dispense with the spring 42 and to make at least certain parts of the braking device 22 and/or blocking device 19-21 from a suitable insulating material. It is further possible to use the antifriction bearing 11 as a component part of the connecting means, e.g., by providing the inner side of the web 39 of the frame 12 with a groove for reception of conductive material, e.g., a material corresponding to that of the tire 34, conductive portion 133 and/or conductive portion 135. Alternatively, the groove in the underside of the web 39 can extend only from the bearing pin 23 to the adjacent outer race of the bearing 11.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A caster comprising a conductive carrier; an insulating frame mounted on said carrier for rotation about a first axis; a wheel mounted in said frame for rotation about a second axis which is inclined with reference to said first axis, said wheel having a conductive rim; a braking device actuatable to oppose rotation of said wheel about said second axis; a blocking device actuatable to prevent rotation of said frame about said first axis; means for actuating said devices; and means for electrically connecting said carrier with said rim.

2. The caster of claim 1, wherein said connecting means includes at least a portion of at least one of said devices.

3. The caster of claim 1, wherein said frame consists, at least in part, of a plastic material.

4. The caster of claim 1, wherein said actuating means comprises a plunger which is non-rotatably but axially movably mounted in said carrier, and means for moving said plunger between a plurality of positions including a first position in which said plunger actuates said blocking device, a second position in which said plunger actuates said braking device, and a third position in which said devices are idle.

5. The caster of claim 4, wherein said moving means comprises means for biasing said plunger to at least one of said positions.

6. The caster of claim 4, wherein said moving means comprises a cam which is rotatably mounted in said carrier and is engaged by said plunger.

7. The caster of claim 1, wherein said connecting means includes a plurality of discrete electrically connected sections.

8. The caster of claim 7, wherein said rim contains a plastic material and said carrier contains a metallic material.

9. The caster of claim 1, wherein said wheel further comprises a hub and a spoke connecting said rim with said hub, said spoke having at least one channel and said connecting means comprising a first portion connected with said rim and disposed in said at least one channel and a further portion connected with said first portion and including an antifriction bearing installed in said frame and mounting said hub.

10. The caster of claim 9, wherein said rim includes a conductive tire which contains a plastic material and is connected with the first portion of said connecting means, and an annular support surrounded by said tire and rigid with said spoke.

11. The caster of claim 10, wherein said spoke includes a disc extending radially of said second axis between said hub and said support.

12. The caster of claim 1, wherein said wheel further comprises a hub and said connecting means comprises an antifriction roller bearing having an outer race and an inner race, said connecting means further comprising a fulcrum mounted in said frame, contacted by said inner race and defining said second axis.

13. The caster of claim 12, wherein said frame includes two legs flanking said hub and said bearing, said fulcrum including two conductive sleeves each secured to one of said legs and a shaft extending through and connecting said sleeves to each other, said inner race surrounding portions of said sleeves.

14. The caster of claim 1, wherein said frame includes two legs flanking said wheel and a web connecting said legs to each other, at least one of said legs having at least one groove adjacent said wheel and extending from said second axis to said web, said connecting means comprising a fulcrum defining said second axis and a conductor connected with said fulcrum and disposed in said at least one groove.

15. The caster of claim 1, wherein said connecting means comprises at least one resilient element between said braking device and said actuating means.

16. The caster of claim 1, wherein said wheel further comprises a hub and a spoke connecting said hub with said rim, said spoke having at least one substantially radially extending first channel and said hub having a substantially axially extending second channel, said rim comprising a conductive tire and an annular support surrounded by said tire and rigid with said spoke, said connecting means comprising a first portion disposed in said first channel and contacting said tire and a second portion provided in said second channel and contacting said first portion.

17. The caster of claim 16, further comprising a fulcrum provided in said frame, defining said second axis and surrounded by said hub, said connecting means further comprising an antifriction bearing disposed between said fulcrum and said hub and having an inner race and an outer race, said outer race contacting said second portion.

18. The caster of claim 1, wherein said rim includes a tire containing a mixture of elastomeric material and conductive particles.

19. The caster of claim 1, wherein said frame comprises two legs which flank said wheel and at least one of which has at least one groove adjacent said wheel, said connecting means including a fulcrum mounted in and extending between said legs and rotatably mounting said wheel, and a conductor disposed in said at least one groove and including a resilient terminal engaging said fulcrum.

20. The caster of claim 19, wherein said fulcrum includes a shaft which defines said second axis and has an end face adjacent and contacting said terminal.

* * * * *